(12) United States Patent
Doi et al.

(10) Patent No.: US 11,313,435 B2
(45) Date of Patent: Apr. 26, 2022

(54) LARGE V-BELT

(71) Applicant: BANDO CHEMICAL INDUSTRIES, LTD., Kobe (JP)

(72) Inventors: Ikuhito Doi, Kobe (JP); Shogo Kobayashi, Kobe (JP); Yoshihito Nakahira, Kobe (JP)

(73) Assignee: BANDO CHEMICAL INDUSTRIES, LTD., Kobe (JP)

(*) Notice: Subject to any disclaimer, the term of this patent is extended or adjusted under 35 U.S.C. 154(b) by 0 days.

(21) Appl. No.: 17/543,497

(22) Filed: Dec. 6, 2021

(65) Prior Publication Data

US 2022/0090648 A1    Mar. 24, 2022

Related U.S. Application Data

(63) Continuation of application No. PCT/JP2020/018372, filed on May 1, 2020.

(30) Foreign Application Priority Data

Jun. 7, 2019    (JP) .............................. JP2019-107195

(51) Int. Cl.
  *F16G 5/06*    (2006.01)
  *C08L 15/02*    (2006.01)

(52) U.S. Cl.
  CPC ................ *F16G 5/06* (2013.01); *C08L 15/02* (2013.01); *C08L 2205/03* (2013.01); *C08L 2205/06* (2013.01); *C08L 2205/16* (2013.01)

(58) Field of Classification Search
  CPC .............................. F16G 5/06; C08L 2205/16
  See application file for complete search history.

(56) References Cited

U.S. PATENT DOCUMENTS

| | | | |
|---|---|---|---|
| 2012/0295748 A1* | 11/2012 | Shiriike | F16G 5/20 474/264 |
| 2016/0208890 A1* | 7/2016 | Nonaka | C08J 3/203 |
| 2017/0314641 A1* | 11/2017 | Kamba | F16G 1/28 |
| 2020/0124135 A1* | 4/2020 | Tsuchiya | C08L 1/02 |
| 2021/0062892 A1* | 3/2021 | Gerring | B29D 29/106 |

FOREIGN PATENT DOCUMENTS

| | | |
|---|---|---|
| JP | 2016-211589 A | 12/2016 |
| JP | 2018-109443 A | 7/2018 |
| WO | 2015/045255 A1 | 4/2015 |

* cited by examiner

*Primary Examiner* — Michael R Mansen
*Assistant Examiner* — Mark K Buse
(74) *Attorney, Agent, or Firm* — Maschoff Brennan

(57) ABSTRACT

A large V-belt includes an endless rubber belt body including an adhesive rubber layer and a cord embedded in the adhesive rubber layer of the belt body. The large V-belt has a belt thickness of 15 mm or more and the belt width of 10 mm or more at the center, in a belt thickness direction, of a cord embedded position. The belt body further includes reinforced rubber layers made of a rubber composition having a type A durometer hardness of 92 or more, the reinforced rubber layers being stacked on a belt inner side and/or a belt outer side of the adhesive rubber layer in the belt thickness direction.

15 Claims, 3 Drawing Sheets

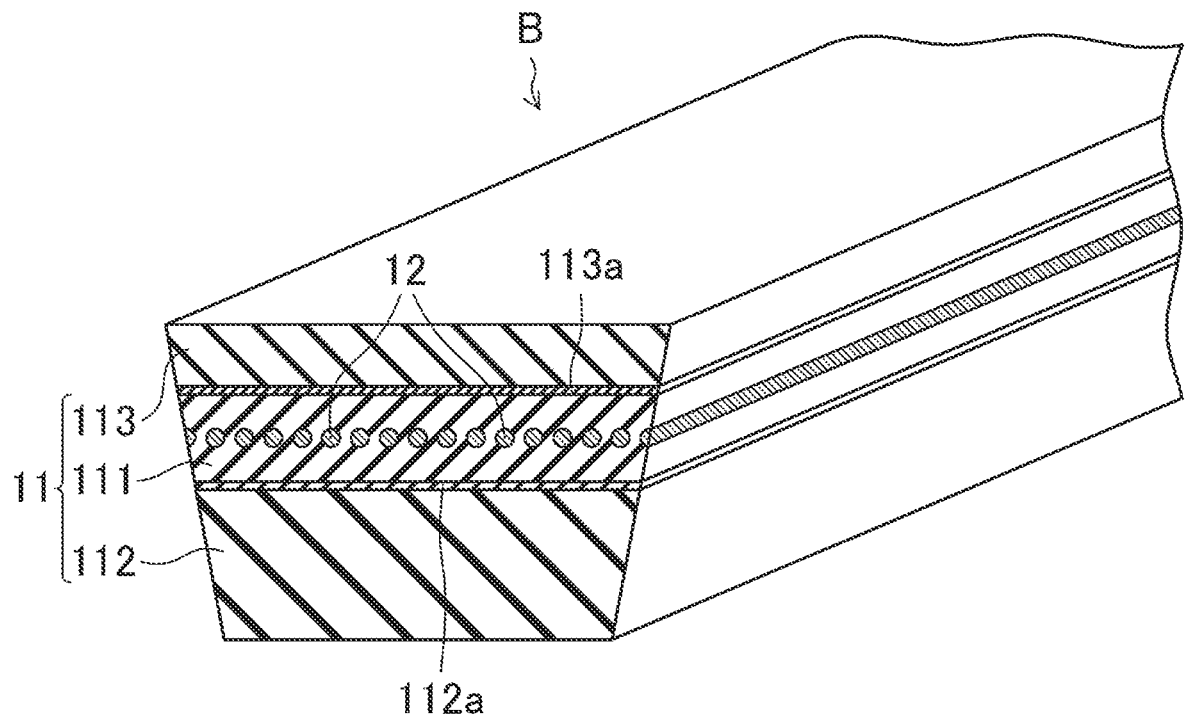
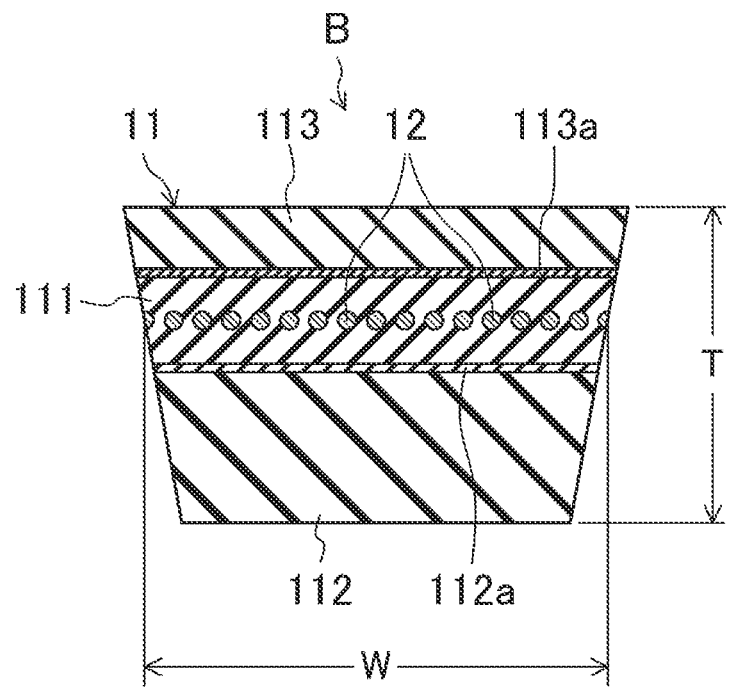

LARGE V-BELT

CROSS-REFERENCE TO RELATED APPLICATIONS

This is a continuation of International Application No. PCT/JP2020/018372 filed on May 1, 2020, which claims priority to Japanese Patent Application No. 2019-107195 filed on Jun. 7, 2019. The entire disclosures of these applications are incorporated by reference herein.

BACKGROUND

The present invention relates to a large V-belt.

In a large V-belt, a blind is embedded on each side, in a belt thickness direction, of an adhesive rubber layer, where a cord is embedded, of a belt body to achieve both of a high rigidity in a belt width direction and bendability in a belt length direction. Japanese Unexamined Patent Publication No. 2018-109443 discloses a large V-belt in which a high-strength fiber sheet is embedded, instead of a blind, on each side of an adhesive rubber layer in a belt thickness direction.

SUMMARY

The present invention is directed to a large V-belt including: an endless belt body made of rubber and including an adhesive rubber layer stacked in a belt thickness direction; and a cord embedded in the adhesive rubber layer of the belt body and extending along a circumferential direction of the belt body while forming a helical pattern having a pitch in a belt width direction, the large V-belt having a belt thickness of 15 mm or more and a belt width of 10 mm or more at a center, in the belt thickness direction, of a cord embedded position, and the belt body further including a reinforced rubber layer made of a rubber composition having a type A durometer hardness of 92 or more, the reinforced rubber layer being stacked on a belt inner side and/or a belt outer side of the adhesive rubber layer in the belt thickness direction.

BRIEF DESCRIPTION OF THE DRAWINGS

FIG. 2A is a perspective view of a piece of a large V-belt of a second embodiment.

FIG. 2B is a cross-sectional view of the large V-belt of the second embodiment.

DETAILED DESCRIPTION

Embodiments will be described in detail below.

First Embodiment

Figure 1A:
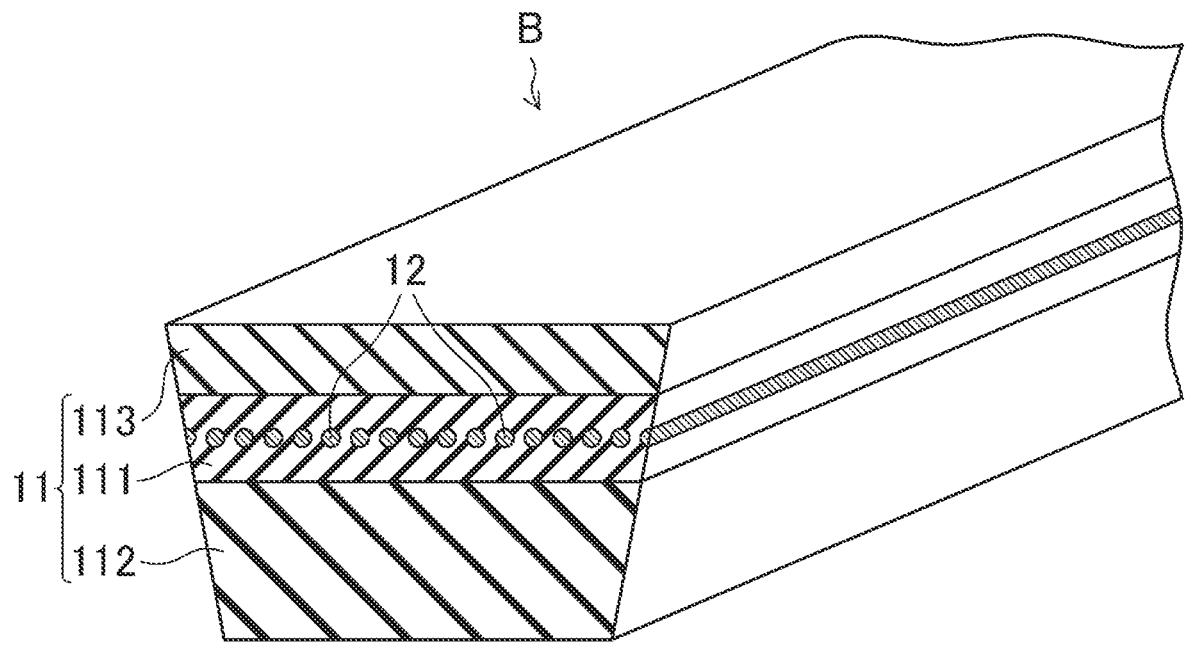
FIG. 1A is a perspective view of a piece of a large V-belt of a first embodiment.
Figure 1B:
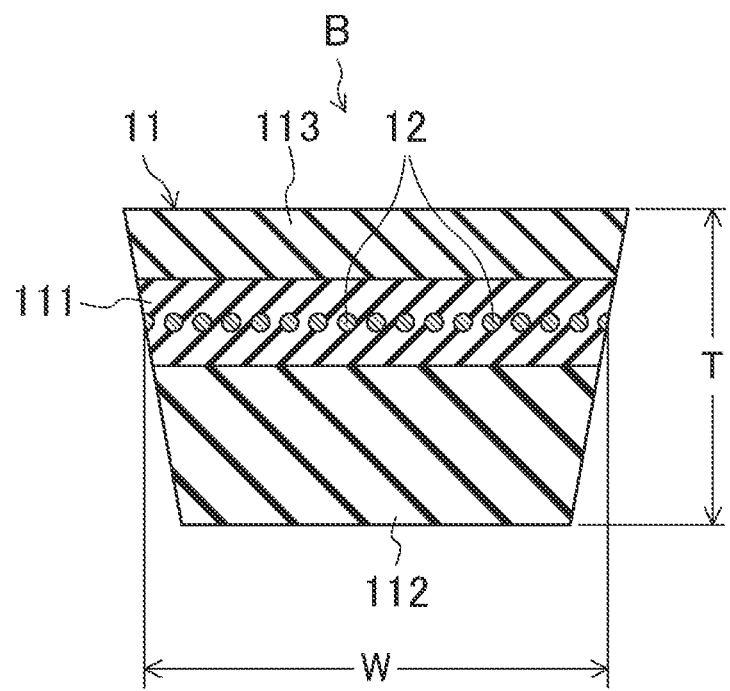
FIG. 1B is a cross-sectional view of the large V-belt of the first embodiment.
Figure 3:
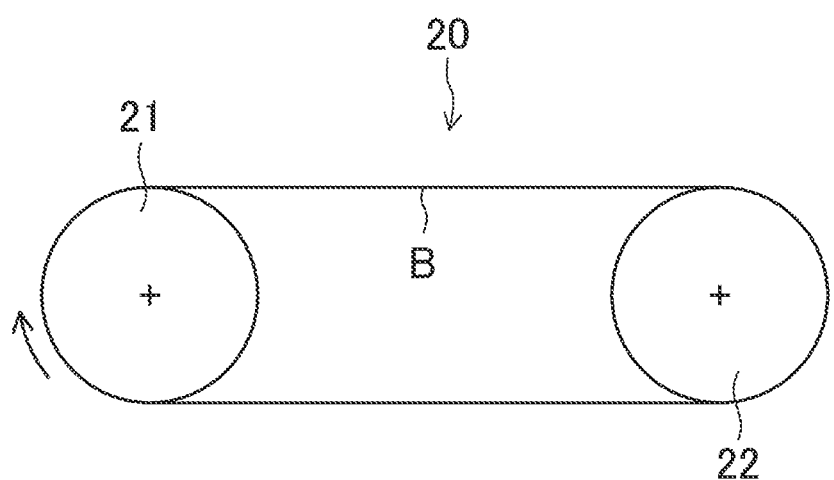
FIG. 3 is a view of a layout of pulleys of a belt running tester.

FIGS. 1A and 1B illustrate a large V-belt B of a first embodiment. The large V-belt B of the first embodiment is a raw edge V-belt used in a large machine, such as an agricultural machine, a compressor, a crusher, a generator, and a pump, in addition to a two-wheeled or four-wheeled automobile.

The large V-belt B of the first embodiment includes an endless belt body 11 made of rubber. The cross-sectional shape of the belt body 11 is a trapezoidal shape whose width increases from an inner side of the belt to an outer side of the belt. Inclined surfaces of the belt body 11 on both sides thereof are formed as pulley contact surfaces.

The belt body 11 includes three layers, i.e., an adhesive rubber layer 111, a compressed rubber layer 112, and a stretch rubber layer 113. The adhesive rubber layer 111 is stacked in a belt thickness direction at an intermediate portion of the belt body 11 in the belt thickness direction. The compressed rubber layer 112 is stacked in the belt thickness direction on the belt inner side of the adhesive rubber layer 111. The stretch rubber layer 113 is stacked in the belt thickness direction on the belt outer side of the adhesive rubber layer 111.

The large V-belt B of the first embodiment includes a cord 12 embedded in an intermediate portion of the adhesive rubber layer 111 in the belt thickness direction. The cord 12 is provided to extend in a circumferential direction to form a helical pattern with pitches in the belt width direction. Note that no fabric member such as a blind is provided between the adhesive rubber layer 111 and the compressed rubber layer 112 and between the adhesive rubber layer 111 and the stretch rubber layer 113.

The belt thickness T of the large V-belt B of the first embodiment is 15 mm or more, suitably 15 mm or more and 40 mm or less, more suitably 16 mm or more and 35 mm or less, and much more suitably 17 mm or more and 30 mm or less. The belt width W of the large V-belt B of the first embodiment at the center, in the belt thickness direction, of a cord embedded position is 10 mm or more, suitably 10 mm or more and 120 mm or less, more suitably 20 mm or more and 100 mm or less, and much more suitably 25 mm or more and 80 mm or less. The belt length of the large V-belt B of the first embodiment is, for example, 500 mm or more and 6000 mm or less.

The adhesive rubber layer 111, the compressed rubber layer 112, and the stretch rubber layer 113 of the belt body 11 are each made of a crosslinked rubber composition which is produced through heating and pressing of an uncrosslinked rubber composition prepared by kneading a blend of a rubber component and various compound ingredients. Of these layers, the compressed rubber layer 112 and the stretch rubber layer 113 form reinforced rubber layers each made of a rubber composition A having a type A durometer hardness of 92 or more. Thus, in the large V-belt B of the first embodiment, the compressed rubber layer 112 and the stretch rubber layer 113 each form a reinforced rubber layer as a whole.

In general, there are concerns that in a case where a fabric member, such as a blind or a high-strength fiber sheet, is embedded on each side, in the belt thickness direction, of an adhesive rubber layer of a large V-belt, high torque applied to the belt may result in excessive shear stress acting on an interface between the fabric member and a rubber portion on each side of the fabric member, leading to damage due to interfacial fracture, because there is a great difference in an elastic modulus between the fabric member and the rubber portion on each side of the fabric member. Further, shear stress applied by a pulley to the pulley contact surfaces on both sides is transmitted to a cord to generate tension, and there are concerns that the rubber portion may receive most of the shear stress because the fabric member exposed on the pulley contact surfaces has a low coefficient of friction, and therefore that damage may be caused due to stress concentration on the rubber portion.

According to the large V-belt B of the first embodiment, the belt body 11 includes the compressed rubber layer 112 and the stretch rubber layer 113 provided to be stacked, in the belt thickness direction, on the belt inner side and the belt outer side of the adhesive rubber layer 111, respectively, and serving as the reinforced rubber layers. The compressed rubber layer 112 and the stretch rubber layer 113 are made of the rubber composition A having a type A durometer hardness of 92 or more. It is therefore possible to achieve both of a high rigidity in the belt width direction and bendability in a belt length direction. This is assumed to be because, unlike the fabric member such as a blind, there is not a great difference in an elastic modulus between the reinforced rubber layer made of the rubber composition A and the rubber portion on each side, and because a portion exposed on the pulley contact surfaces has a low coefficient of friction.

The type A durometer hardness of the rubber composition A as described herein is suitably 92 or more and 98 or less, more suitably 93 or more and 96 or less, and much more suitably 94 or more and 95 or less in order to achieve both of a high rigidity in the belt width direction and the bendability in the belt length direction. The type A durometer hardness as described herein is measured in accordance with JIS K6253-3: 2012. Suitably, from a similar point of view, both of the compressed rubber layer 112 and the stretch rubber layer 113 form the reinforced rubber layers made of the rubber composition A. In this case, the compressed rubber layer 112 and the stretch rubber layer 113 may be made of the same rubber composition A or different rubber compositions A. Suitably, from a similar point of view, the rubber composition A is arranged such that its grain direction corresponds to the belt width direction and its cross-grain direction corresponds to the belt length direction.

The storage normal modulus E' of the rubber composition A at 25° C. in the grain direction is, for example, 700 MPa or more and 2000 MPa or less. The storage normal modulus E' of the rubber composition A at 25° C. in the cross-grain direction is suitably 80 MPa or more and 200 MPa or less, more suitably 85 MPa or more and 150 MPa or less, much more suitably 90 MPa or more and 140 MPa or less, and still much more suitably 100 MPa or more and 130 MPa or less. The ratio of the storage normal modulus E' of the rubber composition A at 25° C. in the grain direction to the storage normal modulus E' of the rubber composition A at 25° C. in the cross-grain direction (storage normal modulus E' at 25° C. in grain direction/storage normal modulus E' at 25° C. in cross-grain direction) is suitably 8.5 or more and 20 or less and more suitably 10 or more and 15 less in order to increase the elastic modulus differences in the belt width direction and the belt length direction and achieve both of a high rigidity in the belt width direction and the bendability in the belt length direction. The storage normal modulus E' as described herein is measured in accordance with JIS K6394: 2007.

Examples of the rubber component in the rubber composition A include: chloroprene rubber (CR); ethylene-α-olefin elastomer such as ethylene propylene copolymer (EPR), ethylene-propylene-diene terpolymer (EPDM), ethylene-octene copolymer, and ethylene-butene copolymer; chlorosulfonated polyethylene rubber (CSM); and hydrogenated acrylonitrile rubber (H-NBR), for example. The rubber component is suitably one type of these rubbers or a blend of two or more types of these rubbers, and more suitably contains chloroprene rubber (CR) and much more suitably contains sulfur-modified chloroprene rubber (sulfur-modified CR) in order to achieve both of a high rigidity in the belt width direction and the bendability in the belt length direction.

The rubber composition A suitably contains cellulose-based fine fibers dispersed in the rubber component in order to achieve both of a high rigidity in the belt width direction and the bendability in the belt length direction. The cellulose-based fine fibers are a fiber material derived from cellulose fine fibers made of a cytoskeleton component of a plant cell wall and obtained by disentangling plant fibers. Example raw plants for the cellulose-based fine fibers include wood, bamboo, rice plants (rice straw), potato, sugarcane (bagasse), water plants, seaweed, etc. Among these materials, wood is suitable.

The cellulose-based fine fibers include cellulose fine fibers themselves and hydrophobized cellulose fine fibers obtained by hydrophobization of the cellulose fine fibers. The cellulose-based fine fibers suitably contain one or both of these fibers.

The cellulose-based fine fibers include those manufactured by a mechanically-defibrating means and having a high aspect ratio and those manufactured by a chemically-defibrating means and having a needle crystal. The cellulose-based fine fibers suitably contain one or both of these fibers, and more suitably contain cellulose-based fine fibers manufactured by a mechanically-defibrating means in order to achieve both of a high rigidity in the belt width direction and the bendability in the belt length direction.

The average fiber diameter of the cellulose-based fine fibers is, for example, 10 nm or more and 1000 nm or less. The average fiber length of the cellulose-based fine fibers is, for example, 0.1 μm or more to 1000 μm or less. The content of the cellulose-based fine fibers in the rubber composition A is suitably 1 part by mass or more and 20 parts by mass or less, more suitably 1.5 parts by mass or more and 10 parts by mass or less, and much more suitably 2 parts by mass or more and 5 parts by mass or less relative to 100 parts by mass of the rubber component in order to achieve both of a high rigidity in the belt width direction and the bendability in the belt length direction.

The rubber composition A may contain carbon black dispersed in the rubber component. Examples of the carbon black include: channel black; furnace black such as SAF, ISAF, N-339, HAF, N-351, MAF, FEF, SRF, GPF, ECF, and N-234; thermal black such as FT and MT; and acetylene black. The carbon black suitably contains one type or two or more types of these substances, and more suitably contains carbon black having an arithmetic average particle diameter of 50 μm or less and much more suitably contains FEF in order to achieve both of a high rigidity in the belt width direction and the bendability in the belt length direction.

The content of the carbon black in the rubber composition A is suitably 20 part by mass or more and than 80 parts by mass or less and more suitably 25 parts by mass or more and 55 parts by mass or less relative to 100 parts by mass of the rubber component in order to achieve both of a high rigidity in the belt width direction and the bendability in the belt length direction. When the rubber composition A contains both of the cellulose-based fine fibers and the carbon black, the content of the carbon black in the rubber composition A is suitably greater than the content of the cellulose-based fine fibers from a similar point of view. The ratio of the content of the carbon black to the content of the cellulose-based fine fibers (content of carbon black/content of cellulose-based fine fibers) in the rubber composition A is suitably 5 or more and 20 or less and more suitably 11 or more and 18 or less from a similar point of view.

The rubber composition A may contain short fibers dispersed in the rubber component. Suitably, the short fibers are oriented in the belt width direction in order to achieve both of a high rigidity in the belt width direction and the bendability in the belt length direction.

Examples of the short fibers include para-aramid short fibers (polyparaphenylene terephthalamide short fibers, copolyparaphenylene-3,4'-oxydiphenylene terephthalamide short fibers), meta-aramid short fibers, nylon 66 short fibers, polyester short fibers, ultrahigh molecular weight polyolefin short fibers, polyparaphenylene benzobisoxazole short fibers, polyarylate short fibers, cotton, glass short fibers, and carbon short fibers. The short fibers suitably include one type or two or more types of these substances, and suitably include the para-aramid short fibers and more suitably include the copolyparaphenylene-3,4'-oxydiphenylene terephthalamide short fibers in order to achieve both of a high rigidity in the belt width direction and the bendability in the belt length direction.

The fiber length of the short fiber is suitably 1 mm or more and 5 mm or less and more suitably 2 mm or more and 4 mm or less in order to achieve both of a high rigidity in the belt width direction and the bendability in the belt length direction. From a similar point of view, the fiber diameter of the short fiber is suitably 5 μm or more and 30 μm or less and more suitably 10 μm or more and 15 μm or less. Suitably, the short fibers are subjected to adhesion treatment such as RFL treatment for providing adhesion to the compressed rubber layer 112 and the stretch rubber layer 113 of the belt body 11.

The content of the short fibers in the rubber composition A is suitably 20 part by mass or more and 40 parts by mass or less and more suitably 25 parts by mass or more and 35 parts by mass or less relative to 100 parts by mass of the rubber component in order to achieve both of a high rigidity in the belt width direction and the bendability in the belt length direction.

Suitably, the rubber composition A contains both of the cellulose-based fine fibers and the short fibers in order to achieve both of a high rigidity in the belt width direction and the bendability in the belt length direction. If the uncrosslinked rubber composition of the rubber composition A before crosslinking contains cellulose-based fine fibers, such an uncrosslinked rubber composition has low viscosity, making it possible for the short fibers to be highly dispersed upon kneading and highly oriented upon forming into a sheet. Anisotropy of the elastic modulus therefore occurs, and both of the high rigidity in the belt width direction and the bendability in the belt length direction are achieved by arranging the grain direction, which us relatively high elastic, to correspond to the belt width direction and the cross-grain direction, which is relatively low elastic, to correspond to the belt length direction.

In this case, the content of the short fibers in the rubber composition A is suitably greater than the content of the cellulose-based fine fibers in order to achieve both of a high rigidity in the belt width direction and the bendability in the belt length direction. The ratio of the content of the short fibers to the content of the cellulose-based fine fibers (content of short fibers/content of cellulose-based fine fibers) in the rubber composition A is suitably 5 or more and 20 or less and more suitably 9 or more and 15 or less from a similar point of view.

In a case where the rubber composition A contains both of the carbon black and the short fibers, the content of the short fibers in the rubber composition A is suitably less than the content of the carbon black in order to achieve both of a high rigidity in the belt width direction and the bendability in the belt length direction. The ratio of the content of the short fibers to the content of the carbon black (content of short fibers/content of carbon black) in the rubber composition A is suitably 0.45 or more and 0.90 or less and more suitably 0.55 or more and 0.80 or less from a similar point of view. The sum of the content of the carbon black and the content of the short fibers in the rubber composition A is suitably 50 parts by mass or more and 100 parts by mass or less and more suitably 60 parts by mass or more and 90 parts by mass or less relative to 100 parts by mass of the rubber component from a similar point of view.

The rubber composition A may contain, as other compound ingredients, a plasticizer, a processing aid, an antioxidant, a crosslinking agent, a vulcanization accelerator, a vulcanization accelerator aid, etc.

The adhesive rubber layer 111 may be made of the same rubber composition A as the compositions of the compressed rubber layer 112 and/or the stretch rubber layer 113, may be made of a rubber composition A different from the compositions of the compressed rubber layer 112 and/or the stretch rubber layer 113, or may be made of a rubber composition that is not the rubber composition A. Suitably, the rubber composition forming the adhesive rubber layer 111 contains substantially no short fibers having a fiber diameter of 10 μm or more. The phrase "contain substantially no short fibers" as used herein means that no short fibers are contained at all or the content of the short fibers is 3 parts by mass or less relative to 100 parts by mass of the rubber component.

The cord 12 is made of a twisted yarn of fibers, such as polyester fibers, polyethylene naphthalate fibers, aramid fibers, and vinylon fibers. The cord 12 is suitably subjected to adhesion treatment such as RFL treatment for providing adhesion to the adhesive rubber layer 111 of the belt body 11.

The large V-belt B of the first embodiment can be manufactured by a known method typically performed.

Second Embodiment

FIGS. 2A and 2B illustrate a large V-belt B of a second embodiment. Note that the same reference characters as those used in the first embodiment will be used to designate the same elements as those in the first embodiment.

In the large V-belt B of the second embodiment, a compressed rubber layer 112 has a belt-inner-side reinforced rubber layer 112a stacked on, and in contact with, a belt inner side of an adhesive rubber layer 111 in a belt thickness direction; and a stretch rubber layer 113 has a belt-outer-side reinforced rubber layer 113a stacked on, and in contact with, an outer side of the adhesive rubber layer 111 in the belt thickness direction. The belt-inner-side reinforced rubber layer 112a and the belt-outer-side reinforced rubber layer 113a are made of a rubber composition A having a type A durometer hardness of 92 or more.

According to the large V-belt B of the second embodiment, the belt body 11 includes the belt-inner-side reinforced rubber layer 112a of the compressed rubber layer 112 and the belt-outer-side reinforced rubber layer 113a of the stretch rubber layer 113 which are stacked on the belt inner side and the belt outer side, respectively, of the adhesive rubber layer 111 in the belt thickness direction; and the belt-inner-side reinforced rubber layer 112a and the belt-outer-side reinforced rubber layer 113a are made of the rubber composition A having a type A durometer hardness of 92 or more. Thus, both of a high rigidity in a belt width direction and bendability in a belt length direction can be achieved.

Suitably, a portion of the compressed rubber layer 112 other than the belt-inner-side reinforced rubber layer 112a is made of the rubber composition A having a different composition from the composition of the belt-inner-side reinforced rubber layer 112a, but may be made of a rubber composition that is not the rubber composition A. Similarly, a portion of the stretch rubber layer 113 other than the belt-outer-side reinforced rubber layer 113a is suitably made of the rubber composition A having a different composition from the composition of the belt-outer-side reinforced rubber layer 113a, but may be made of a rubber composition that is not the rubber composition A.

The large V-belt B of the second embodiment can be manufactured by a known method typically performed. Other configurations, features, and advantages are the same as those of the first embodiment.

Other Embodiments

In the first embodiment, the compressed rubber layer 112 and the stretch rubber layer 113 as the reinforced rubber layers are provided on both sides of the adhesive rubber layer 111. However, the configuration is not limited thereto, and only one of the compressed rubber layer 112 or the stretch rubber layer 113 may be provided as the reinforced rubber layer. Similarly, in the second embodiment, the belt-inner-side reinforced rubber layer 112a and the belt-outer-side reinforced rubber layer 113a are provided on both sides of the adhesive rubber layer 111. However, the configuration is not limited thereto, and only one of the belt-inner-side reinforced rubber layer 112a or the belt-outer-side reinforced rubber layer 113a may be provided.

In the second embodiment, the belt-inner-side reinforced rubber layer 112a and the belt-outer-side reinforced rubber layer 113a are provided so as to be in contact with the adhesive rubber layer 111. However, the configuration is not limited thereto, and the belt-inner-side reinforced rubber layer 112a or the belt-outer-side reinforced rubber layer 113a may be provided at an intermediate portion of the compressed rubber layer 112 or the stretch rubber layer 113 closer to the adhesive rubber layer 111 in the belt thickness direction.

In the first and second embodiments, the large V-belt B including the rubber belt body 11 and the cord 12 has been described. However, the configuration is not limited thereto, and the large V-belt B may include reinforcing fabric covering a belt-inner-side surface and/or a belt-outer-side surface of the belt body 11.

In the first and second embodiments, the large V-belt B without cogs on the inner and outer sides of the belt has been described. However, the configuration is not limited thereto, and the large V-belt B may have cogs on the inner side and/or the outer side of the belt at constant pitches in the belt length direction.

In the first and second embodiments, the raw edge V-belt as the large V-belt B has been described. However, the configuration is not limited thereto, and the large V-belt B may be a wrapped V-belt having reinforcing fabric covering the entirety of a belt body.

EXAMPLES (Uncrosslinked Rubber Composition)

Uncrosslinked rubber compositions of the following rubbers 1 to 5 were prepared. Constituents of each rubber will also be shown in Table 1.

<Rubber 1>

Sulfur-modified CR obtained by air-dying and solidifying sulfur-modified CR latex was charged into a rubber kneader and was kneaded. Then, 50 parts by mass of carbon black (an FEF arithmetic average particle diameter: 43 μm), 5 parts by mass of a plasticizer (DOS), 1 part by mass of a processing aid (stearic acid), 2.3 parts by mass of an antioxidant, and 5 parts by mass of magnesium oxide relative to 100 parts by mass of the sulfur-modified CR of a rubber component were charged into the rubber kneader and kneaded. Thereafter, 5 parts by mass of zinc oxide and 25 parts by mass of RFL-treated para-aramid short fibers (copolyparaphenylene-3,4'-oxydiphenylene terephthalamide short fibers, a fiber length of 3 mm, a fiber diameter of 12 μm) were further charged and kneaded. An uncrosslinked rubber composition was prepared in this manner and was referred to as rubber 1.

A sheet-shaped rubber composition was obtained by heating and pressing and thereby crosslinking the rubber 1. The type A durometer hardness of the thus-obtained rubber composition measured in accordance with JIS K6253-3: 2012 was 93. The storage normal modulus E' at 25° C. in the grain direction measured in accordance with JIS K6394: 2007 was 1040 MPa. The storage normal modulus E' at 25° C. in the cross-grain direction was 120 MPa. The ratio of the storage normal modulus E' in the grain direction to the storage normal modulus E' in the cross-grain direction was 8.7.

<Rubber 2>

An uncrosslinked rubber composition was prepared which had the same constituents as those of the rubber 1 except that the content of the para-aramid short fibers was 20 parts by mass relative to 100 parts by mass of the sulfur-modified CR of the rubber component. This uncrosslinked rubber composition was referred to as rubber 2.

A sheet-shaped rubber composition was obtained by heating and pressing and thereby crosslinking the rubber 2. The type A durometer hardness of the thus-obtained rubber composition was 90. The storage normal modulus E' at 25° C. in the grain direction was 676 MPa. The storage normal modulus E' at 25° C. in the cross-grain direction was 84.6 MPa. The ratio of the storage normal modulus E' in the grain direction to the storage normal modulus E' in the cross-grain direction was 8.0.

<Rubber 3>

An uncrosslinked rubber composition was prepared which had the same constituents as those of the rubber 1 except that the content of the para-aramid short fibers was 30 parts by mass relative to 100 parts by mass of the sulfur-modified CR of the rubber component. This uncrosslinked rubber composition was referred to as rubber 3.

A sheet-shaped rubber composition was obtained by heating and pressing and thereby crosslinking the rubber 3. The type A durometer hardness of the thus-obtained rubber composition was 95. The storage normal modulus E' at 25° C. in the grain direction was 1352 MPa. The storage normal modulus E' at 25° C. in the cross-grain direction was 142 MPa. The ratio of the storage normal modulus E' in the grain direction to the storage normal modulus E' in the cross-grain direction was 9.5.

<Rubber 4>

Kraft pulp was added to water such that the content of the kraft pulp reached 1% by mass, and the resultant mixture was preliminarily mixed with a stirrer and then charged into a micronizing device (Star Burst manufactured by Sugino Machine Limited). Subsequently, a process of pressurizing the mixture up to the 150 MPa and then causing the mixture to collide with a ceramic ball was repeated a total of eight times. In this manner, an aqueous dispersion of cellulose-based fine fibers manufactured by a mechanically-defibrating means was prepared.

The aqueous dispersion of the cellulose-based fine fibers was mixed with sulfur-modified CR latex such that the content of the cellulose-based fine fibers reached 3 parts by mass relative to 100 parts by mass of sulfur-modified CR of a rubber component of the sulfur-modified CR latex, and the resultant mixture was air-dried and solidified to obtain a CR-cellulose-based fine fiber composite.

An uncrosslinked rubber composition was prepared which had the same constituents as those of the rubber 1 except that the CR-cellulose-based fine fiber composite was used instead of the sulfur-modified CR and that the content of carbon black was 30 parts by mass relative to 100 parts by mass of the sulfur-modified CR of the rubber component. This uncrosslinked rubber composition was referred to as rubber 4.

A sheet-shaped rubber composition was obtained by heating and pressing and thereby crosslinking the rubber 4. The type A durometer hardness of the thus-obtained rubber composition was 94. The storage normal modulus E' at 25° C. in the grain direction was 1040 MPa. The storage normal modulus E' at 25° C. in the cross-grain direction was 88.9 MPa. The ratio of the storage normal modulus E' in the grain direction to the storage normal modulus E' in the cross-grain direction was 11.7.

<Rubber 5>

An uncrosslinked rubber composition was prepared which had the same constituents as those of the rubber 3 except that the same CR-cellulose-based fine fiber composite as that of the rubber 4 was used instead of sulfur-modified CR. This uncrosslinked rubber composition was referred to as rubber 5.

A sheet-shaped rubber composition was obtained by heating and pressing and thereby crosslinking the rubber 5. The type A durometer hardness of the thus-obtained rubber composition was 95. The storage normal modulus E' at 25° C. in the grain direction was 1612 MPa. The storage normal modulus E' at 25° C. in the cross-grain direction was 129 MPa. The ratio of the storage normal modulus E' in the grain direction to the storage normal modulus E' in the cross-grain direction was 12.5.

TABLE 1

|  |  | Rubber 1 | Rubber 2 | Rubber 3 | Rubber 4 | Rubber 5 |
| --- | --- | --- | --- | --- | --- | --- |
| Rubber Constituents Parts by Mass | Rubber Component (Sulfur-Modified CR) | 100 | 100 | 100 | 100 | 100 |
|  | Cellulose-Based Fine Fibers X | 0 | 0 | 0 | 3 | 3 |
|  | Carbon Black (FEF) Y | 50 | 50 | 50 | 30 | 50 |
|  | Para-Aramid Short Fibers Z | 25 | 20 | 30 | 25 | 30 |
|  | Plasticizer (DOS) | 5 | 5 | 5 | 5 | 5 |
|  | Processing Aid (Stearic Acid) | 1 | 1 | 1 | 1 | 1 |
|  | Antioxidant | 2.3 | 2.3 | 2.3 | 2.3 | 2.3 |
|  | Magnesium Oxide | 5 | 5 | 5 | 5 | 5 |
|  | Zinc Oxide | 5 | 5 | 5 | 5 | 5 |
|  | Y/X | — | — | — | 10.0 | 16.7 |
|  | Z/X | — | — | — | 8.33 | 10.0 |
|  | Z/Y | 0.50 | 0.40 | 0.60 | 0.83 | 0.60 |
|  | Y + Z | 75 | 70 | 80 | 55 | 80 |
| Type A Durometer Hardness |  | 93 | 90 | 95 | 94 | 95 |
| Storage Normal Modulus E' in Grain Direction MPa |  | 1040 | 676 | 1352 | 1040 | 1612 |
| Storage Normal Modulus E' in Cross-Grain Direction MPa |  | 120 | 84.6 | 142 | 88.9 | 129 |
| E' in Grain Direction/E' in Cross-Grain Direction |  | 8.7 | 8.0 | 9.5 | 11.7 | 12.5 |

(Large V-Belt)

Large V-belts of the following Examples 1 to 5 and Comparative Examples 1 to 4 were produced. The configuration of each belt is also shown in Table 2.

EXAMPLE 1

A large V-belt having a configuration similar to that of the first embodiment were produced in which: a compressed rubber layer and a stretch rubber layer were made of the rubber 1; a belt thickness was 25 mm; a belt width at the center, in the belt thickness direction, of a cord embedded position was 50 mm; and a belt length was 2200 mm. The thus-obtained large V-belt was referred to as Example 1.

An adhesive rubber layer was made of a rubber composition using sulfur-modified CR as a rubber component. The rubber composition was obtained by adding, relative to 100 parts by mass of the rubber component, 60 parts by mass of carbon black (an FEF arithmetic average particle diameter: 43 μm), 5 parts by mass of a plasticizer (DOS), 1 part by mass of a processing aid (stearic acid), 2.3 parts by mass of an antioxidant, 5 parts by mass of magnesium oxide, and 5 parts by mass of a co-crosslinking agent (bismaleimide). A twisted yarn made of polyester fibers subjected to RFL treatment and rubber cement treatment was used as a cord. Upon use, the rubber 1 was arranged such that the grain direction corresponds to the belt width direction and the cross-grain direction corresponds to the belt length direction.

EXAMPLE 2

A large V-belt was produced which had the same configuration as that of Example 1 except that the large V-belt had a configuration similar to that of the second embodiment, that a belt-inner-side reinforced rubber layer and a belt-outer-side reinforced rubber layer were made of the rubber 1, and that a portion of a compressed rubber layer other than the belt-inner-side reinforced rubber layer and a portion of a stretch rubber layer other than the belt-outer-side reinforced rubber layer were made of the rubber 2. The thus-obtained large V-belt was referred to as Example 2.

EXAMPLE 3

A large V-belt was produced which had the same configuration as that of Example 1 except that the large V-belt had a configuration similar to that of the second embodiment, that a belt-inner-side reinforced rubber layer and a belt-outer-side reinforced rubber layer were made of the rubber 3, and that a portion of a compressed rubber layer other than the belt-inner-side reinforced rubber layer and a portion of a stretch rubber layer other than the belt-outer-side reinforced rubber layer were made of the rubber 1. The thus-obtained large V-belt was referred to as Example 3.

EXAMPLE 4

A large V-belt was produced which had the same configuration as that of Example 1 except that the large V-belt has a configuration similar to that of the first embodiment and that a compressed rubber layer and a stretch rubber layer were made of the rubber 4. The thus-obtained large V-belt was referred to as Example 4.

EXAMPLE 5

A large V-belt was produced which had the same configuration as that of Example 1 except that the large V-belt had a configuration similar to that of the second embodiment, that a belt-inner-side reinforced rubber layer and a belt-outer-side reinforced rubber layer were made of the rubber 5, and that a portion of a compressed rubber layer other than the belt-inner-side reinforced rubber layer and a portion of a stretch rubber layer other than the belt-outer-side reinforced rubber layer were made of the rubber 4. The thus-obtained large V-belt was referred to as Example 5.

COMPARATIVE EXAMPLE 1

A large V-belt was produced having the same configuration as that of Example 1 except that a compressed rubber layer and a stretch rubber layer were made of the rubber 1 and that nylon fiber blinds with a rubber composition of an adhesive rubber layer adhered thereto were provided between the adhesive rubber layer and the compressed rubber layer and between the adhesive rubber layer and the stretch rubber layer. The thus-obtained large V-belt was regarded as Comparative Example 1.

COMPARATIVE EXAMPLE 2

A large V-belt was produced which had the same configuration as that of Comparative Example 1 except that a compressed rubber layer and a stretch rubber layer were made of the rubber 2. The thus-obtained large V-belt was referred to as Comparative Example 2.

COMPARATIVE EXAMPLE 3

A large V-belt was produced which had the same configuration as that of Comparative Example 1 except that a compressed rubber layer and a stretch rubber layer were made of the rubber 3. The thus-obtained large V-belt was referred to as Comparative Example 3.

COMPARATIVE EXAMPLE 4

A large V-belt was produced which had the same configuration as that of Example 1 except that a compressed rubber layer and a stretch rubber layer were made of the rubber 2. The thus-obtained large V-belt was referred to as Comparative Example 4.

TABLE 2

| | Examples | | | | | Comparative Examples | | | |
|---|---|---|---|---|---|---|---|---|---|
| | 1 | 2 | 3 | 4 | 5 | 1 | 2 | 3 | 4 |
| Compressed Rubber Layer • Stretch Rubber Layer | Rubber 1 | — | — | Rubber 4 | — | Rubber 1 | Rubber 2 | Rubber 3 | Rubber 2 |
| Compressed Rubber Layer Reinforced Rubber Layer | — | Rubber 1 | Rubber 3 | — | Rubber 5 | — | — | — | — |
| Stretch Rubber Layer Other Than Reinforced Rubber Layer | — | Rubber 2 | Rubber 1 | — | Rubber 4 | — | — | — | — |
| Blind | No | No | No | No | No | Yes | Yes | Yes | No |
| Durability Life Index | 65 | 60 | 70 | 82 | 100 | 40 | 38 | 50 | 20 |

(Test Method)

FIG. 2 illustrates a layout of pulleys of a belt running tester 20.

The belt running tester 20 includes a drive pulley 21 and a driven pulley 22 provided with a space in a right-left direction. The drive pulley 21 and the driven pulley 22 each have a pulley diameter of 260 mm, and have V-grooves at the outer peripheries thereof.

Each of the large V-belts B of Examples 1 to 5 and Comparative Examples 1 to 4 was wrapped so as to be fitted in the V-grooves of the drive pulley 21 and the driven pulley 22. Then, under an ambient temperature of 23° C., a rotational load of 52 kW was applied to the driven pulley 22, and in this state, the drive pulley 21 was rotated at the number of revolutions of 2000 rpm to cause the belt to run until breakage of the belt. Then, a running time from the start of the belt running to the breakage of the belt was measured as a durability life. The durability life of Example 5 was considered 100, and a relative value therefor was determined to be a durability life index.

(Test Results)

The test results are shown in Table 2. Table 2 shows that Examples 1 to 5, in which the compressed rubber layer and the stretch rubber layer or the belt-inner-side reinforced rubber layer and the belt-outer-side reinforced rubber layer on both sides of the adhesive rubber layer are made of the rubber composition having a type A durometer hardness of 92 or more, exhibit higher durability life indices as compared to Comparative Examples 1 to 3, in which blinds are provided on both sides of the adhesive rubber layer, and Comparative Example 4, in which the compressed rubber layer and the stretch rubber layer on both sides of the adhesive rubber layer are made of the rubber composition having a type A durometer hardness of 90 that is less than 92. Table 2 also shows that Examples 4 and 5, in which the compressed rubber layer and the stretch rubber layer or the belt-inner-side reinforced rubber layer and the belt-outer-side reinforced rubber layer are made of the rubber composition containing the cellulose-based fine fibers, exhibit much higher durability life indices as compared to Examples 1 to 3 in which these layers are made of the rubber composition containing no cellulose-based fine fibers.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A large V-belt comprising:
   an endless belt body made of rubber and including an adhesive rubber layer stacked in a belt thickness direction; and
   a cord embedded in the adhesive rubber layer of the belt body and extending along a circumferential direction of the belt body while forming a helical pattern having a pitch in a belt width direction,
   the large V-belt having a belt thickness of 15 mm or more and a belt width of 10 mm or more at a center, in the belt thickness direction, of a cord embedded position,
   the belt body further including a reinforced rubber layer made of a rubber composition having a type A durometer hardness of 92 or more, the reinforced rubber layer being stacked on a belt inner side and/or a belt outer side of the adhesive rubber layer in the belt thickness direction,
   the rubber composition containing a rubber component, cellulose-based fine fibers, carbon black, and para-aramid short fibers,
   a content of the para-aramid short fibers in the rubber composition being 25 parts by mass or more and 40 parts by mass or less relative to 100 parts by mass of the rubber component,
   a sum of a content of the carbon black and the content of the para-aramid short fibers in the rubber composition being 50 parts by mass or more and 100 parts by mass or less relative to 100 parts by mass of the rubber component,
   the rubber composition being arranged such that a grain direction thereof corresponds to the belt width direction and a cross-grain direction thereof corresponds to a belt length direction,
   a storage normal modulus E' of the rubber composition at 25° C. in the cross-grain direction being 80 MPa or more and 200 MPa or less, and
   a ratio of a storage normal modulus E' of the rubber composition at 25° C. in the grain direction to the storage normal modulus E' of the rubber composition at 25° C. in the cross-grain direction being 10 or more and 20 or less.

2. The large V-belt of claim 1, wherein
   the rubber component of the rubber composition includes chloroprene rubber.

3. The large V-belt of claim 1, wherein
   the para-aramid short fibers include copolyparaphenylene-3,4'-oxydiphenylene terephthalamide short fibers.

4. The large V-belt of claim 1, wherein
   the cellulose-based fine fibers include cellulose-based fine fibers formed by a mechanically-defibrating means.

5. The large V-belt of claim 1, wherein
   a content of the cellulose-based fine fibers in the rubber composition is 1 part by mass or more and 20 parts by mass or less relative to 100 parts by mass of the rubber component.

6. The large V-belt of claim 1, wherein
   the content of the para-aramid short fibers in the rubber composition is greater than the content of the cellulose-based fine fibers.

7. The large V-belt of claim 6, wherein
   a ratio of the content of the para-aramid short fibers to the content of the cellulose-based fine fibers in the rubber composition is 5 or more and 20 or less.

8. The large V-belt of claim 1, wherein
   the carbon black includes FEF.

9. The large V-belt of claim 1, wherein
   the content of the carbon black in the rubber composition is 20 parts by mass or more and 80 parts by mass or less relative to 100 parts by mass of the rubber component.

10. The large V-belt of claim 1, wherein
    the content of the para-aramid short fibers in the rubber composition is less than the content of the carbon black.

11. The large V-belt of claim 10, wherein
    a ratio of the content of the para-aramid short fibers to the content of the carbon black in the rubber composition is 0.45 or more and 0.90 or less.

12. The large V-belt of claim 1, wherein
    the content of the carbon black in the rubber composition is greater than the content of the cellulose-based fine fibers.

13. The large V-belt of claim 12, wherein
    a ratio of the content of the carbon black to the content of the cellulose-based fine fibers in the rubber composition is 5 or more and 20 or less.

14. The large V-belt of claim 1, wherein
    the storage normal modulus E' of the rubber composition at 25° C. in the grain direction is 700 MPa or more and 2000 MPa or less.

15. The large V-belt of claim 1, wherein
    the carbon black has an arithmetic average particle diameter of 50 μm or less.

* * * * *